United States Patent
Seidl

(10) Patent No.: US 10,167,031 B2
(45) Date of Patent: Jan. 1, 2019

(54) ANTI-OSCILLATING LUGGAGE SYSTEM

(71) Applicant: Bayerische Motoren Werke Aktiengesellschaft, Munich (DE)

(72) Inventor: Josef Seidl, Dingolfing (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 15/470,982

(22) Filed: Mar. 28, 2017

(65) Prior Publication Data

US 2017/0197681 A1    Jul. 13, 2017

Related U.S. Application Data

(63) Continuation of application No. PCT/EP2015/072246, filed on Sep. 28, 2015.

(30) Foreign Application Priority Data

Nov. 6, 2014  (DE) ................. 10 2014 222 728

(51) Int. Cl.
*B62J 9/00*   (2006.01)

(52) U.S. Cl.
CPC ....................... *B62J 9/00* (2013.01)

(58) Field of Classification Search
CPC .......................................................... B62J 9/00
USPC ........................................................ 224/428
See application file for complete search history.

(56) References Cited

U.S. PATENT DOCUMENTS 848,889 A * 4/1907 Fitzgerald ............... A45C 9/00
  190/16
1,601,547 A * 9/1926 Wofford ............... B65D 81/127
  206/591
1,792,627 A * 2/1931 Bowersock .......... B65D 5/5054
  206/591
2,979,246 A * 4/1961 Liebeskind ............ B65D 5/509
  156/245
3,477,553 A * 11/1969 Kish, Jr. .................. A45C 5/02
  190/119

(Continued)

FOREIGN PATENT DOCUMENTS

| CN | 102358368 A | 2/2012 |
|---|---|---|
| CN | 202923777 U | 5/2013 |
| CN | 103892553 A | 7/2014 |
| CN | 104015844 A | 9/2014 |

(Continued)

OTHER PUBLICATIONS

International Search Report (PCT/ISA/210) issued in PCT Application No. PCT/EP2015/072246 dated Jan. 15, 2016 with English-language translation (twelve (12) pages).

(Continued)

*Primary Examiner* — Peter Helvey

(74) *Attorney, Agent, or Firm* — Crowell & Moring LLP

(57) ABSTRACT

The invention provides a luggage system for a single-track motor vehicle, in particular a motorcycle or motor scooter. The luggage system includes a luggage-accommodating container to be fastened on the motor vehicle. The luggage-accommodating container, in its interior, has a decoupling device that interacts with an item of luggage to be accommodated in the container. The decoupling device at least partially decouples, from the luggage-accommodating container, travel-induced forces exerted by the item of luggage.

12 Claims, 2 Drawing Sheets

(56) References Cited

U.S. PATENT DOCUMENTS

| | | | | |
|---|---|---|---|---|
| 3,730,308 A * | 5/1973 | Pelavin | A45C 3/001 | 190/115 |
| 4,339,039 A * | 7/1982 | Mykleby | B65D 81/107 | 206/523 |
| 4,573,202 A * | 2/1986 | Lee | A45C 3/00 | 190/107 |
| 4,762,231 A * | 8/1988 | Kiselewski | A45C 13/021 | 206/522 |
| 4,801,213 A * | 1/1989 | Frey | A45C 13/021 | 206/522 |
| 4,874,093 A * | 10/1989 | Pharo | B65D 81/03 | 206/522 |
| 5,002,184 A * | 3/1991 | Lloyd | A45C 11/24 | 206/305 |
| 5,010,988 A * | 4/1991 | Brown | A45C 3/00 | 190/104 |
| 5,114,060 A * | 5/1992 | Boyer | B62J 7/06 | 224/413 |
| 5,494,157 A * | 2/1996 | Golenz | A45C 3/02 | 190/111 |
| 5,525,989 A * | 6/1996 | Holt | A42B 3/0433 | 342/20 |
| 5,624,035 A * | 4/1997 | Kim | B65D 81/052 | 206/521 |
| 5,651,485 A * | 7/1997 | Impastato, II | B62J 11/00 | 224/246 |
| 5,655,695 A * | 8/1997 | Anderson | B62J 11/00 | 206/315.1 |
| 5,704,232 A * | 1/1998 | Kuo | B62J 11/00 | 248/229.1 |
| 5,769,292 A * | 6/1998 | Cucheran | B60R 9/045 | 224/319 |
| 5,781,145 A * | 7/1998 | Williams | G01S 7/495 | 342/175 |
| 5,881,936 A * | 3/1999 | Li | B62J 7/06 | 224/413 |
| 5,909,806 A * | 6/1999 | Fischel | G06F 1/1628 | 190/115 |
| 6,000,592 A * | 12/1999 | Clanin | B62J 11/00 | 224/413 |
| 6,023,876 A * | 2/2000 | Haddad | A01K 97/06 | 43/25.2 |
| 6,092,707 A * | 7/2000 | Bowes, Jr. | H04B 1/3888 | 206/320 |
| 6,109,434 A * | 8/2000 | Howard, Jr. | G06F 1/1601 | 206/320 |
| 6,237,766 B1 * | 5/2001 | Hollingsworth | A45C 13/02 | 190/103 |
| 6,305,241 B1 * | 10/2001 | Masui | B62J 11/00 | 224/420 |
| 6,321,912 B1 * | 11/2001 | Lippert | A45C 5/14 | 206/320 |
| D451,672 S * | 12/2001 | Rasmussen | D3/276 | |
| 6,334,534 B1 * | 1/2002 | Hollingsworth | A45C 13/02 | 206/320 |
| 6,338,260 B1 * | 1/2002 | Cousins | A45C 13/10 | 190/120 |
| 6,378,815 B1 * | 4/2002 | Lee | B62J 7/06 | 224/420 |
| 6,390,429 B1 * | 5/2002 | Brincat | B62J 11/00 | 224/420 |
| 6,561,400 B2 * | 5/2003 | Lee | B62J 7/06 | 224/413 |
| 6,568,644 B2 * | 5/2003 | Pedersen | B62J 7/08 | 224/309 |
| 6,783,040 B2 * | 8/2004 | Batchelor | B62J 9/008 | 224/406 |
| 6,793,186 B2 * | 9/2004 | Pedersen | B60R 9/048 | 224/309 |
| 6,854,628 B1 * | 2/2005 | Stehr | B62J 11/00 | 224/413 |
| 6,861,970 B1 * | 3/2005 | Garland | G01S 7/4806 | 342/175 |
| 7,143,913 B2 * | 12/2006 | Lindsey | B62J 11/00 | 206/317 |
| 7,264,116 B2 * | 9/2007 | Prentza | A45C 3/02 | 206/320 |
| 7,270,209 B2 * | 9/2007 | Suess | B60K 15/03006 | 180/69.5 |
| 7,271,760 B2 * | 9/2007 | Bartosik | G01S 7/022 | 342/175 |
| 7,318,617 B1 * | 1/2008 | Scotton | B60R 5/045 | 224/484 |
| 7,504,983 B2 * | 3/2009 | Chen | B62J 11/00 | 342/20 |
| 7,549,535 B2 * | 6/2009 | Pelo | A45C 13/02 | 206/320 |
| 7,631,756 B2 * | 12/2009 | Picot | A45C 13/02 | 206/320 |
| 7,643,274 B2 * | 1/2010 | Bekele | G06F 1/1616 | 206/320 |
| 7,934,761 B2 * | 5/2011 | Buehl | B60R 7/02 | 296/37.1 |
| 7,942,031 B2 * | 5/2011 | Tranquilli | G08B 17/113 | 73/12.01 |
| 8,051,721 B2 * | 11/2011 | Amir | G01P 15/00 | 73/856 |
| 8,192,118 B2 * | 6/2012 | Zahorec | B60R 7/005 | 410/118 |
| 8,261,954 B2 * | 9/2012 | Lee | B60R 11/0258 | 224/282 |
| 8,353,400 B2 * | 1/2013 | Santy | A45C 11/00 | 190/102 |
| 8,365,969 B2 * | 2/2013 | Johnson | B60R 9/08 | 190/14 |
| 8,567,578 B2 * | 10/2013 | Cuong | A45C 3/02 | 190/100 |
| 8,602,277 B2 * | 12/2013 | Lee | B60R 11/0258 | 224/282 |
| 8,613,379 B2 * | 12/2013 | Lee | B62J 11/00 | 224/282 |
| 8,708,205 B2 * | 4/2014 | Wotton | B62J 11/00 | 224/413 |
| 8,763,795 B1 * | 7/2014 | Oten | A45C 11/00 | 206/320 |
| 8,800,830 B2 * | 8/2014 | Hoshi | B62J 11/00 | 224/413 |
| 8,925,778 B1 * | 1/2015 | Gordon | B62J 9/00 | 224/413 |
| 8,950,582 B2 * | 2/2015 | Chang | B65D 81/022 | 206/521 |
| 9,120,432 B2 * | 9/2015 | Fan | B60R 11/02 | |
| 9,408,456 B2 * | 8/2016 | Hart | A45F 5/021 | |
| 9,527,451 B2 * | 12/2016 | Krishnan | B60R 5/047 | |
| 9,650,096 B2 * | 5/2017 | Visenzi | B62J 9/00 | |
| 9,675,148 B2 * | 6/2017 | Yuan | A45C 11/00 | |
| 9,682,738 B1 * | 6/2017 | Silva | B62J 11/00 | |
| 2002/0163220 A1 * | 11/2002 | Ament | B60R 5/047 | 296/37.16 |
| 2010/0012696 A1 | 1/2010 | Prager | | |
| 2010/0147918 A1 * | 6/2010 | Hensley | B62J 9/001 | 224/600 |
| 2014/0091120 A1 | 4/2014 | Thompson | | |

FOREIGN PATENT DOCUMENTS

| | | |
|---|---|---|
| DE | 195 41 612 A1 | 5/1997 |
| EP | 1 186 475 A2 | 3/2002 |
| JP | 64-47689 A | 2/1989 |
| KR | 10-2012-0010503 A | 2/2012 |

OTHER PUBLICATIONS

German-language Written Opinion (PCT/ISA/237) issued in PCT Application No. PCT/EP2015/072246 dated Jan. 15, 2016 (eighteen (18) pages).

(56) References Cited

OTHER PUBLICATIONS

German Search Report issued in counterpart German Application No. 10 2014 222 728.3 dated Sep. 24, 2015 with partial English-language translation (thirteen (13) pages).
Chinese-language Office Action issued in counterpart Chinese Application No. 201580043278.X dated Sep. 25, 2018 with English translation (12 pages).

* cited by examiner

ANTI-OSCILLATING LUGGAGE SYSTEM

CROSS REFERENCE TO RELATED APPLICATIONS

This application is a continuation of PCT International Application No. PCT/EP2015/072246, filed Sep. 28, 2015, which claims priority under 35 U.S.C. § 119 from German Patent Application No. 10 2014 222 728.3, filed Nov. 6, 2014, the entire disclosures of which are herein expressly incorporated by reference.

BACKGROUND AND SUMMARY OF THE INVENTION

The invention relates to a luggage system for a single-track motor vehicle, in particular a motorcycle or motor scooter, having a decoupling device for items of luggage for the purpose of reducing oscillating movements during travel.

The prior art discloses various solutions for counteracting the oscillation of motorcycles when laden with luggage. The solutions usually concern high-outlay designs for the interaction of the luggage-accommodating container (pannier, top case) with the frame of the motor vehicle and for the purpose of avoiding the situation where forces generated by travel and in particular, the relative wind are introduced into the frame via the luggage-accommodating container. The disclosure of patent application US 2014091120 A would be one to mention as an example of such an embodiment.

Such systems, however, involve a lot of outlay, are costly and cannot be retrofitted. In addition, they obstruct the pillion rider and limit the freedom of movement of the latter.

It is therefore an object of the invention to provide a simplified, more cost-effective and retrofittable luggage system for a motorcycle or a motor scooter.

This and other objects are achieved in accordance with embodiments of the invention.

The basic inventive concept is that of decoupling the item of luggage from the luggage-accommodating container via a decoupling device so as to reduce the oscillation-triggering forces and the effect on the motor vehicle. The invention provides various solutions for decoupling.

The invention proposes a luggage system for a single-track motor vehicle (motorcycle or motor scooter or three-wheeled vehicle with two front wheels or two rear wheels), having a luggage-accommodating container, which can be fastened on the motor vehicle and, in the interior includes a decoupling device, which interacts with an item of luggage to be accommodated and which is intended for at least partially decoupling from the luggage-accommodating container travel-induced forces exerted by the item of luggage.

The decoupling device decouples the luggage-accommodating container from the item of luggage so that forces which act on the luggage-accommodating container by the item of luggage during travel do not act on the motor vehicle to a pronounced extent. The centrifugal forces of the items of luggage are decoupled from the luggage-accommodating container to the greatest extent by different possible embodiments described hereinafter.

The first embodiment provides a luggage system, in which the decoupling device is formed by the inner wall of the luggage-accommodating container being designed in the form of an elastic, deformable wall with cavities, which is either in a sandwich construction or made of foam. The inner wall of the luggage-accommodating container is adapted such that the item of luggage accommodated therein, when subjected to forces, can yield and penetrate some way into the inner wall, which deforms in the process and absorbs kinetic energy. The inner wall designed in this way allows the item of luggage to move relative to the luggage-accommodating container, and this results in a phase-shifted introduction of force into the motor vehicle via the luggage-accommodating container.

A further variant provides for the decoupling device to be realized by at least one impact strip or buffer strip which encloses the item of luggage laterally in the circumferential direction. At the top and/or at the bottom is at least one impact strip or buffer strip arranged on an inner wall of the luggage-accommodating container. The at least one impact strip or buffer strip penetrates into the interior of the luggage-accommodating container to a depth which ensures permanent contact with the item of luggage. The impact strip or buffer strip likewise provides for the item of luggage to move relative to the luggage-accommodating container in a manner which converts kinetic energy into deformation energy.

A further alternative exemplary embodiment proposes a solution in which the decoupling device is formed by the handle of the luggage system interacting with a holder on an inner wall of the luggage-accommodating container, wherein the decoupling is provided for by virtue of the item of luggage being suspended on a suspension device formed on the luggage-accommodating container or by virtue of the handle being accommodated elastically on the inner wall of the luggage-accommodating container. The item of luggage can thus be fastened in the luggage-accommodating container in a suspended state or be clamped elastically via the handle. In the case of a hanging solution, measures which delimit the movement capability are optionally taken in addition to, for example a lining of the inner wall as described above.

A further variant provides for the decoupling device to be formed by a tub or base plate which is arranged in the luggage-accommodating container and accommodated for movement in a transverse direction perpendicular to a direction of travel. The item of luggage is placed on the tub or base plate and moves to a predetermined extent within the luggage-accommodating container when subjected to the influence of force from the outside. In addition, one embodiment provides for the tub or base plate to have holders on its base for the purpose of surrounding and/or fixing the item of luggage. The surrounding itself may be elastically or partially plastically deformable, in order to limit relative movement.

In addition, or as an alternative, in an advantageous embodiment of the invention in which the luggage system has a tub or base plate, buffers and/or stops are arranged in the peripheral regions of the luggage-accommodating container for the purpose of damping and/or delimiting a movement capability of the tub or base plate.

A further alternative exemplary embodiment proposes a solution in which the luggage system is characterized in that the decoupling device is formed by a hanging device which hangs down freely, is fastened on the luggage-accommodating container in a filling region and in which the item of luggage can be placed in position and transported in a freely hanging state. An advantageous solution here is one in which the hanging device is realized in the form of elastic netting or of an elastic rubber tub. The variant corresponds to a kind of "hammock" for the item of luggage within the luggage-accommodating container, and this makes it possible to realize relative movements. The movement capability is delimited by appropriate retaining means or a combination with a lining of the inner wall of the luggage-accommodating container.

In an advantageous embodiment, and applicable in general to all the embodiments described, the item of luggage is accommodated in the luggage-accommodating container in a form-fitting or force-fitting manner, with prestressing, by the decoupling device.

Other advantageous developments of the invention are characterized in the dependent claims and/or are presented in more detail hereinafter together with the description of the preferred embodiment of the invention and with reference to the figures.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
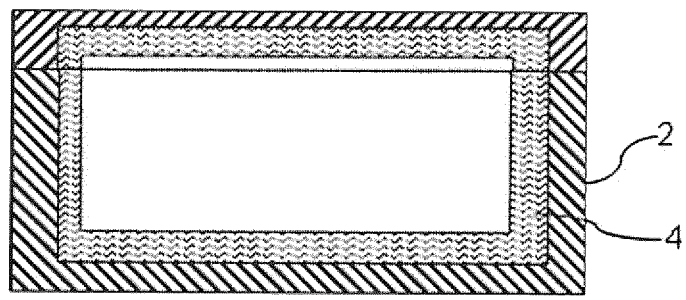
FIG. 1 is a schematic sectional illustration as seen from the side of a first embodiment of a luggage system.

FIG. 1 shows a schematic sectional illustration as seen from the side of a first embodiment of a luggage system, in which an elastic or partially elastically deformable wall 4 made of foam is formed on the inside of a luggage-accommodating container 2 designed in the form of a case. The item of luggage (not illustrated) (for example a suitcase, a bag or a caddy) is to be pushed against said wall under the influence of centrifugal force. As a result, the wall decouples the item of luggage from the luggage-accommodating container 2.

Figure 2:
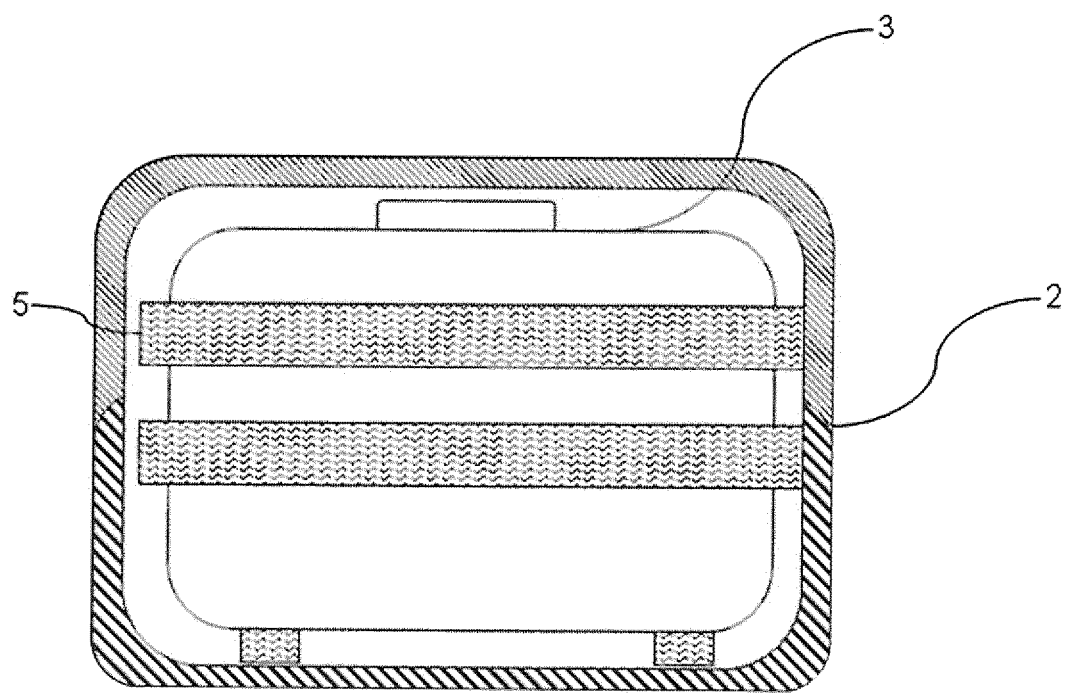
FIG. 2 is a schematic sectional illustration as seen from the side of a second embodiment of a luggage system.

FIG. 2 shows the decoupling device achieved by means of a buffer strip 5, which fixes the item of luggage 3, designed in the form of a suitcase, in the luggage-accommodating container 2, but at the same time performs a buffer function for decoupling purposes in relation to the item of luggage 3. In the embodiment shown, the buffer strip 5 is provided laterally all the way around the item of luggage and on the underside of the same. Decoupling on the upper side can be achieved via the handle of the item of luggage.

Figure 3:
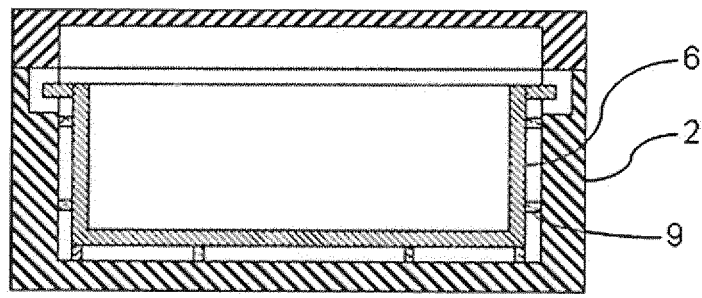
FIG. 3 is a schematic sectional illustration as seen from the side of a third embodiment of a luggage system.

In FIG. 3, a decoupling device is formed by a tub 6 which is arranged in the luggage-accommodating container 2 and accommodated for movement in the direction of travel and transversally thereto. A plurality of damping buffers 9 are distributed in peripheral regions of the luggage-accommodating container 2. The damping buffers 9 damp and limit a relative movement of the tub 6 and therefore between the luggage-accommodating container 2 and an item of luggage. The tub 6 may be formed from plastics material, rubber or a fabric.

Figure 4:
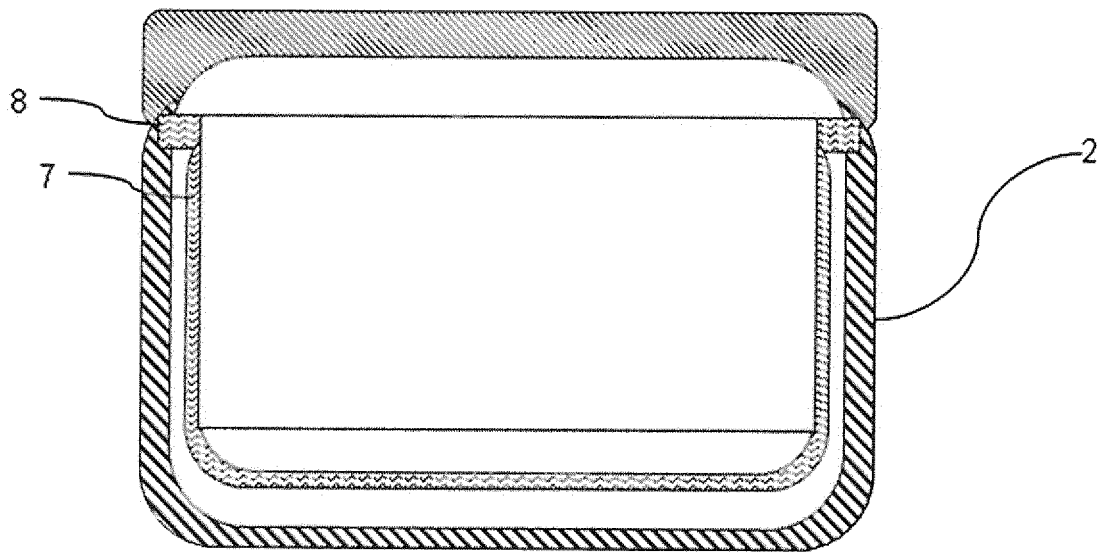
FIG. 4 is a schematic sectional illustration as seen from the side of a fourth embodiment of a luggage system.

FIG. 4 shows a further alternative embodiment, in the case of which the decoupling device is formed by a hanging device 7 which hangs down freely, is mounted on the luggage-accommodating container 2 in the filling region via a peripheral fastening 8 and in which the item of luggage can be placed in position and transported in a freely hanging state. In the embodiment shown, the hanging device 7 is a rubber tub of a shape which complements that of the luggage-accommodating container 2. The peripheral fastening 8 holds the hanging device 7 in position, but elasticity, or partial elasticity, of the tub provides for decoupling from the luggage-accommodating container 2.

The invention is not limited to the preferred exemplary embodiments specified above. It is also contemplated to have a number of variants which make use of the solution presented, even in the case of embodiments which are fundamentally different. For example, it is possible to combine solutions from FIGS. 1 and 4 or 1 and 2 with one another.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A luggage system for a single-track motor vehicle, comprising:
   a rigid luggage-accommodating container to be fastened on the motor vehicle; and
   a decoupling device in an interior of the luggage-accommodating container,
   wherein
      the decoupling device interacts with an item of luggage to be accommodated and at least partially decouples, from the luggage-accommodating container, travel-induced forces exerted by the item of luggage, and
      the decoupling device includes at least one handle configured to interact with at least one holder on an inner wall of the luggage-accommodating container such that decoupling is provided by way of the item of luggage being suspended on a suspension device formed on the luggage-accommodating container or by way of the at least one handle being accommodated elastically on the inner wall of the luggage-accommodating container.

2. The luggage system according to claim 1, wherein the decoupling device is in the form of an elastic and deformable wall with cavities, which is either in a sandwich construction or made of foam.

3. The luggage system according to claim 1, wherein the decoupling device includes at least one impact strip or buffer strip which encloses the item of luggage laterally in a circumferential direction,
the decoupling device includes, at the top or at the bottom, at least one impact strip or buffer strip arranged on an inner wall of the luggage-accommodating container, and
the at least one impact strip or buffer strip penetrates into the interior of the luggage-accommodating container to a depth which provides for permanent contact with the item of luggage.

4. The luggage system according to claim 1, wherein the item of luggage is accommodated in a form-fitting or a force-fitting manner in the luggage-accommodating container by the decoupling device.

5. The luggage system according to claim 2, wherein the item of luggage is accommodated in a form-fitting or a force-fitting manner in the luggage-accommodating container by the decoupling device.

6. The luggage system according to claim 3, wherein the item of luggage is accommodated in a form-fitting or a force-fitting manner in the luggage-accommodating container by the decoupling device.

7. A luggage for a single-track motor vehicle, comprising:
a rigid luggage-accommodating container to be fastened on the motor vehicle; and
a decoupling device in an interior of the luggage-accommodating container,
wherein
the decoupling device interacts with an item of luggage to be accommodated and at least partially decouples, from the luggage-accommodating container, travel-induced forces exerted by the item of luggage, and
the decoupling device includes a tub suspended in the luggage-accommodating container from an upper region of the tub and accommodated for movement in a transverse direction perpendicular to a direction of travel.

8. The luggage system according to claim 7, wherein the tub has holders at bottom for the purpose of surrounding or fixing the item of luggage.

9. The luggage system according to claim 7, wherein buffers or stops are arranged in peripheral regions of the luggage-accommodating container to damp or delimit a movement capability of the tub.

10. The luggage system according to claim 8, wherein buffers or stops are arranged in peripheral regions of the luggage-accommodating container to damp or delimit a movement capability of the tub.

11. The luggage system according to claim 1, wherein the decoupling device is formed by a hanging device which hangs down freely, is fastened on the luggage-accommodating container in a filling region and in which the item of luggage is to be placed in position and transported in a freely hanging state.

12. The luggage system according to claim 11, wherein the hanging device is in the form of an elastic netting or an elastic rubber tub.

* * * * *